(12) United States Patent
Urago

(10) Patent No.: US 9,235,639 B2
(45) Date of Patent: Jan. 12, 2016

(54) FILTER REGULAR EXPRESSION

(71) Applicant: Hewlett-Packard Development Company, L.P., Houston, TX (US)

(72) Inventor: Jean Marie Urago, Sophia-Antipolis (FR)

(73) Assignee: Hewlett Packard Enterprise Development LP, Houston, TX (US)

( * ) Notice: Subject to any disclaimer, the term of this patent is extended or adjusted under 35 U.S.C. 154(b) by 349 days.

(21) Appl. No.: 13/891,689

(22) Filed: May 10, 2013

(65) Prior Publication Data

US 2014/0297663 A1 Oct. 2, 2014

(30) Foreign Application Priority Data

Mar. 28, 2013 (EP) ..................... 13305384

(51) Int. Cl.
G06F 17/30 (2006.01)
G06F 17/22 (2006.01)
G06F 17/27 (2006.01)

(52) U.S. Cl.
CPC ...... G06F 17/30699 (2013.01); G06F 17/2211 (2013.01); G06F 17/277 (2013.01)

(58) Field of Classification Search
CPC ............ G06F 17/277; G06F 17/30699; G06F 17/2211
See application file for complete search history.

(56) References Cited

U.S. PATENT DOCUMENTS

| | | | |
|---|---|---|---|
| 7,225,188 B1 * | 5/2007 | Gai et al. | |
| 7,308,446 B1 * | 12/2007 | Panigrahy et al. | |
| 7,689,530 B1 * | 3/2010 | Williams et al. | 706/62 |
| 7,949,670 B2 | 5/2011 | Sudhakar | |
| 8,015,456 B2 | 9/2011 | Stabile et al. | |
| 8,086,442 B1 | 12/2011 | Wu et al. | |
| 8,572,106 B1 * | 10/2013 | Estan | 707/758 |
| 2002/0021838 A1 * | 2/2002 | Richardson et al. | 382/181 |
| 2003/0023873 A1 * | 1/2003 | Ben-Itzhak | 713/201 |
| 2004/0181527 A1 * | 9/2004 | Burdick et al. | 707/6 |
| 2006/0167873 A1 * | 7/2006 | Degenaro et al. | 707/6 |
| 2009/0070327 A1 | 3/2009 | Loeser et al. | |
| 2010/0057663 A1 * | 3/2010 | Srinivasan et al. | 706/52 |
| 2011/0093484 A1 | 4/2011 | Bando et al. | |
| 2012/0005184 A1 | 1/2012 | Thilagar et al. | |
| 2014/0201224 A1 * | 7/2014 | Schwarz | 707/758 |

FOREIGN PATENT DOCUMENTS

WO WO-02086724 10/2002

OTHER PUBLICATIONS

European Patent Office, Extended European Search Report for Corresponding EP Appl. No. 13305384.3, 2pp, dated Sep. 9, 2013.
Cisco IOS XR System Monitoring Configuration Guide for the Cisco CRS Router, Release 4.2.x,http://www.cisco.com/en/US/docs/routers/crs/software/crs_r4.2/system_monitoring/configuration/guide/b_sysmon_cg42crs.pdf.

* cited by examiner

*Primary Examiner* — Shiow-Jy Fan
(74) *Attorney, Agent, or Firm* — Hewlett Packard Enterprise Patent Department

(57) ABSTRACT

Example embodiments disclosed herein relate to determining a regular expression from a passing set of strings and a blocked set of strings. A regular expression is determined based on the passing set. The regular expression is compared to the blocked set. The passing set is divided into subsets based on the comparison. Regular expressions are determined for the subsets and are ORed together to determine a filter regular expression.

13 Claims, 4 Drawing Sheets

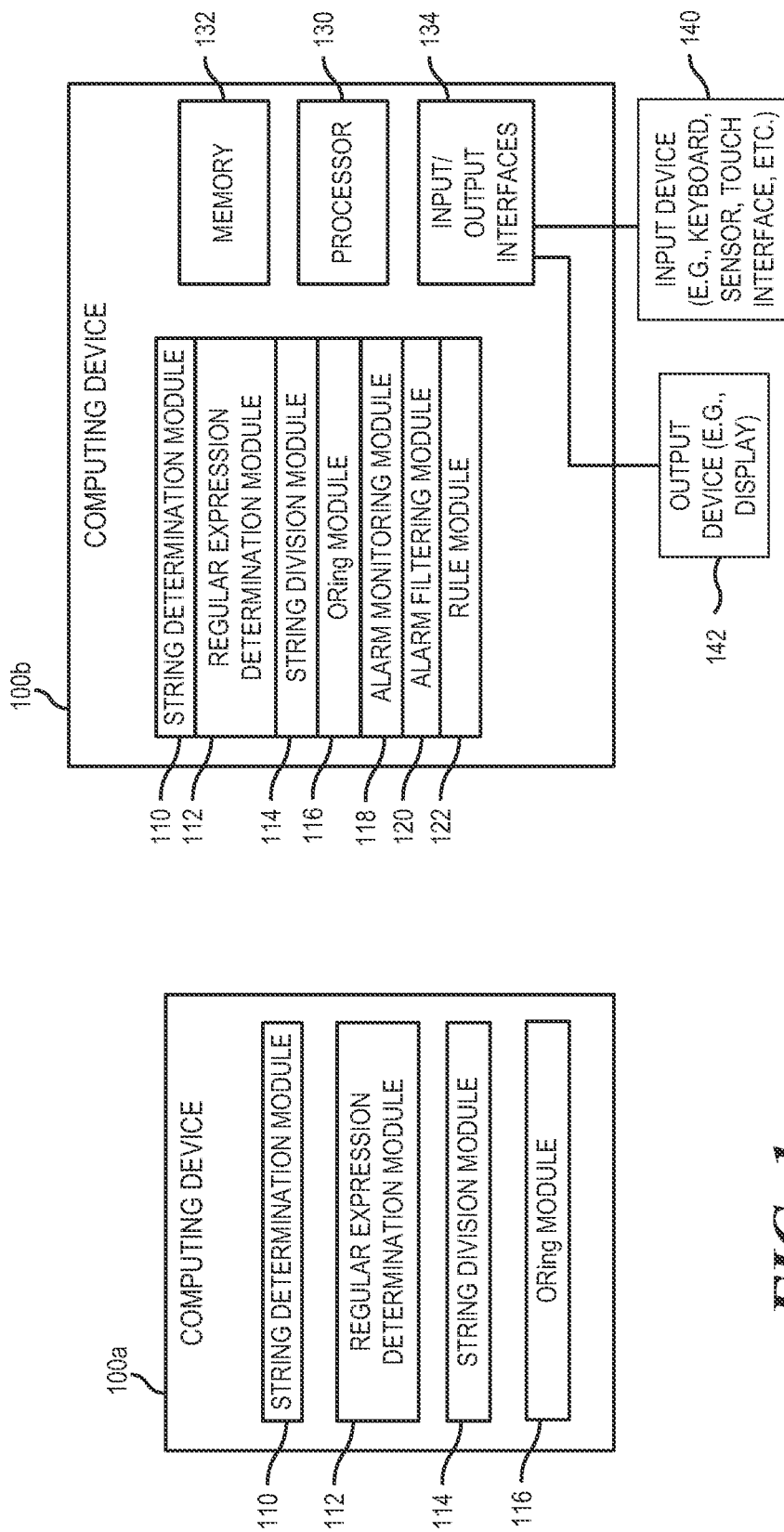

FILTER REGULAR EXPRESSION

BACKGROUND

Service providers (e.g., telecommunications service providers) and manufacturers are challenged to deliver quality and value to consumers, for example by providing analysis, such as fault correlation analysis. For example, analysis can be performed on computers, networks, and other systems. Analysis can occur on strings of characters.

BRIEF DESCRIPTION OF THE DRAWINGS

The following detailed description references the drawings, wherein:

FIGS. 1 and 2 are block diagrams of computing devices capable of determining a regular expression based on a set of passing strings and a set of blocked strings, according to various examples;

DETAILED DESCRIPTION

Figure 3:
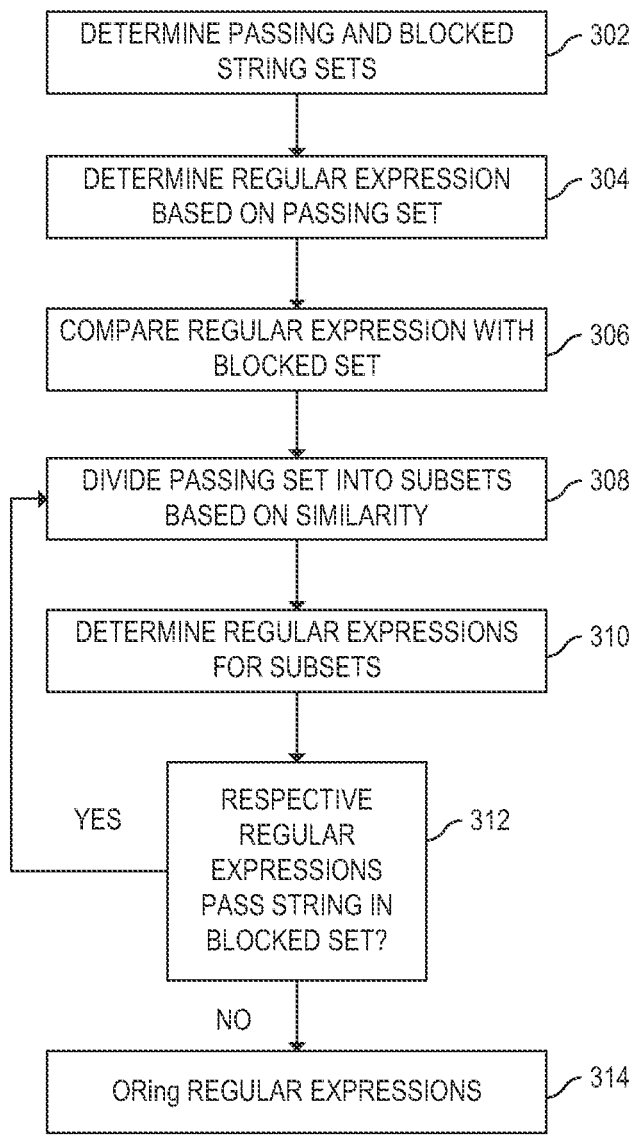
FIG. 3 is a flowchart of a method for generating a regular expression based on a set of passing strings and a set of blocked strings, according to one example.

Data structures such as strings are used in various ways. Sometimes, strings are analyzed to determine whether a string is to be passed, whether a string is to be blocked, etc. For example, in an alarm system, a particular program may monitor strings from communications including alarms. The program may only want to look at or use a subset of the strings. As such, the program may want to filter the strings to look at or group particular strings.

In one approach to filtering, a user may determine a set of strings that the user would like to pass. Other strings may be blocked. This can be done, for example, as an approach to monitor alarms. In one example, an alarm is a string including information that may be relevant to an entity. Alarms may come from one or more devices (e.g., telecommunications devices, network devices such as routers, computing devices, storage devices, etc.). Alarms may be sent to the entity by an entity manager system, broadcast to multiple locations, or combinations thereof. These alarms may include information from the particular device that includes information such as an identifier of the device, a problem associated with the device, etc. Filters may be used on these types of information to determine which alarms should be monitored.

A monitoring or correlation application associated with the entity can compare an incoming string with the filter to determine whether the string should be passed and further analyzed. However, this may be a large filter that can require additional processing time.

Accordingly, various embodiments disclosed herein relate to determining a regular expression that can be used as a filter. The regular expression can be based on a set of passing strings and a set of blocked strings. With this approach, the regular expression can be broader than the set of passing strings, but still block the blocked strings.

As such, the generated regular expression string filter can accept more strings than specified in the passing set of strings. This is helpful because new elements or subcomponents may be added to one or more devices/programs generating the strings. With this approach, these strings can be handled by the filter transparently without changing the regular expression string filter.

In the example of an alarm system, a computing device may monitor multiple alarms. The regular expression may be used to filter the alarms. As such, an alarm can match the regular expression if it would pass through the regular expression.

FIGS. 1 and 2 are block diagrams of computing devices capable of determining a regular expression based on a set of passing strings and a set of blocked strings, according to various examples. Computing devices 100*a*, 100*b* include components that can be utilized to determine a regular expression for filtering based on a passing set of strings and a blocked set of strings. The respective computing devices 100*a*, 100*b* may be a notebook computer, a desktop computer, a tablet computing device, a wireless device, a server, a workstation, a network device, a special purpose machine, or any other computing device.

A string determination module 110 can be used to determine a passing set of strings and a blocked set of other strings. The strings can be imported by a user from a database, entered, or otherwise determined. In some examples, the sets of strings can be selected from a larger set of strings, for example, strings stored in one or more databases.

In one example, a string is a sequence of characters. In some examples, a string can be understood as one or more data types, for example, as a list or as an array of characters, bytes, words, etc. As such, processing of the strings can be based on one or more data types. For example, processing can be based on a character analysis or an analysis of words. In some examples, a word is a fixed size group of bits that are handled as a unit by an instruction set. Words can be sized differently based on instruction set. In the simplified examples described herein, strings are processed as characters, however, it is contemplated that other data types or structures can be used for processing.

In one embodiment, a passing set of strings is the strings that a user would want passed through a filter. The blocked set of strings would be the strings that the user would not want passed through the filter. A benefit of the approach is that a broader filter can be made that blocks the blocked set, but passes more than just the passing set of strings. The filter can be based on a determined regular expression.

A regular expression determination module 112 can determine a regular expression based on the passing set. The regular expression can be based on various approaches, for example, the approach further described with reference to FIG. 4. The passing strings can be stored in a representation of a set of strings using a graph as detailed in FIG. 4. In the graph, the cells can represent a data structure (e.g., a string character, word, etc.). Graph cells that are common to all strings of the passing string set are re-used in the graph. For each string added to the graph, the graph build can find a solution that a) maximizes the number of re-used cells in the graph and/or b) maximizes the number of consecutive matching cells (e.g., longest matching substring). The graph building can also prioritize based on the number of re-used cells and then consecutive matching cells.

In one example, to generate the graph, the regular expression determination module 112 can determine data structures from the passing set of strings. In one example, the data structures can be split into characters, in another example, the data structures can be split into words. Starting with a first one of the passing set of strings, the strings can be iteratively added into the graph using an algorithm that first maximizes the number of re-used cells in the graph and then maximizes the number of consecutive matching cells. Other schemes can also be added.

The regular expression determination module 112 can generate the regular expression from the graph representation. The graph can be traversed from one of its roots (e.g., the first cell of one of the strings) and applying steps. (a) If the graph has several entry points (roots), the regular expression starts with a wildcard (e.g., .*). In this scenario "." is a wildcard character for a single data structure (e.g., character), while ".*" combination matches any number of characters. (b) If the first cell is re-used as many times as the number of strings in the graph, it is added to the regular expression as a string literal. (c) If the cell has more than one children cells, a wildcard (.*) is added to the regular expression. (d) If the cell is not re-used as many times as the number of strings in the graph, the regular expression is not changed. Then, one of the children cells is followed and the steps are performed starting with (b) until the end of the graph is traversed. As such, the regular expression determination module 112 can determine a regular expression based on the passing set.

A string division module 114 can determine whether the passing set should be divided based on the blocking set of strings. In one example, the regular expression can be tested as a filter. In one example, the regular expression can be compared against each of the strings in the blocked set to determine whether the respective strings would pass through the filter. Various techniques can be used to implement the comparison/filter test. If none of the blocked strings are passing, the regular expression is valid and the processing is terminated. If the regular expression matches at least one of the blocked strings, it means that the regular expression is too permissive and should be restricted. As such, if the regular expression passes through a string of the blocked set, then, the string division module 114 divides the passing set into two subsets of strings based on similarity of the strings.

As noted, the string division module 114 is used to split the passing string set into two subsets for which regular expressions are determined for using the process described above. The approach can be performed recursively until using the regular expression determination module 112 and the string division module until none of the strings from the blocked set are passed through the respective regular expressions. If the regular expression of a subset that is generated allows a blocked string to pass through, the subset is divided using the string division module 114. This process can continue on each of the subsets that have regular expressions generated that allow a blocked string to pass. Each of the regular expressions that do not allow blocked strings to pass can be used in a filter regular expression that is a combination of multiple regular expressions generated.

To divide the sets of strings into subsets, the string division module 114 can split the strings into two subsets based on string similarity. In one example, a "distance" can be determined between two strings to determine the similarity between the two strings. The distance between two strings can be derived from the graph structure. A graph is constructed with the two strings in question, string Si and string Sj. The distance, $\delta_{ij}$, between the strings can be established as follows: $\delta_{ij}=[length\ (Si)\ length\ (Sj)]/[2 \times number\ of\ re-used\ cells]$. With this approach, the distance value is 1 when the strings are identical and >1 when the strings differ. Further, various approaches to scaling can also be used. When no cells are in common between the two strings, a high float value or other solution can be used to keep the function from dividing by zero. In one example, to split the passing strings set into two subsets, the first string ($S_1$) of the set and compute the distance between this string and all other strings in the set, for example, to create Table 1.

TABLE 1

| 1 | 2 | 3 | 4 | n |
|---|---|---|---|---|
|   | $\delta_{12}$ | $\delta_{13}$ | $\delta_{14}$ | $\delta_{1n}$ |

Then the average distance is computed e.g., using $(\Sigma\delta_1 k/(n-1))$.

The first string can be put in a first subset with all other strings for which the distance is lower than the average distance. The other strings can be put in the second subset. Other approaches to determining the difference/similarity between two strings can also be used. For example, instead of using the average distance to split the subsets, a variance can be used, or the approach to find the distance can be based on more than the first string (e.g., the distance can be determined for each string to compare with each other string) and the strings that are most similar can be put into separate groups. Moreover, it is contemplated that other approaches for measuring the similarities between strings can be used.

The ORing module 116 can then be used to "OR" the regular expressions from each of the subsets that do not allow a blocked set to pass together. This can be used to generate a filter regular expression. A benefit of the filter regular expression include that it can be broader than just the set of passing string. Further, because the blocked strings do not pass through, the filter regular expression can be more selectively controlled.

This can be useful, for example, in the field of alarm filtering. Alarm correlation is a component of telecommunication networks management as well as other fields. Alarm correlation can aim at solving problems such as alarm reduction, alarm grouping, alarm filtering, etc. For example, alarms can be monitored. When one or more alarms are received that correspond to a particular rule, an action can be set into motion. For example, correlations associated with a rule can determine that when a number of alarms are received from one or more devices, it can relate to an event. The event may have a set of actions that may go along with it (e.g., notify a particular entity such as an administrator, determine a possible area of reduced coverage, etc.).

In one example, alarm monitoring module 118 can be used to monitor a plurality of alarms. One or more programs or logs may want to look at different alarms or be associated with different alarms. As such, the filter regular expression can be used to filter the alarms for a particular program, log, part of program, etc. so that what is passed through the filter can be considered relevant (e.g., relevant to a rule, a task, etc.). An alarm filtering module 120 can filter the alarms monitored. The alarms that pass through the filter can be stored in a log or other data structure. Moreover, the alarms that pass may be monitored by a rule module 122. The rule module 122 can compare one or more of the alarms to a rule or set of rules. When one of the rules is met (e.g., one or more of the alarms are matched to a particular rule, a threshold number of alarms is reached in a particular time frame, etc.), a set of rules, tasks, or activities can be implemented in response.

A processor 130, such as a central processing unit (CPU) or a microprocessor suitable for retrieval and execution of instructions and/or electronic circuits can be configured to perform the functionality of any of the modules 110-122 described herein. In certain scenarios, instructions and/or other information, such as graph information, can be included in memory 132 or other memory. Input/output interfaces 134 may additionally be provided by the computing device 100b. For example, input devices 140, such as a keyboard, a sensor, a touch interface, a mouse, a microphone, etc. can be utilized to receive input from an environment surrounding the computing device 100b. Further, an output device 142, such as a display, can be utilized to present information to users. Examples of output devices include speakers, display devices, amplifiers, etc. Moreover, in certain embodiments, some components can be utilized to implement functionality of other components described herein.

Each of the modules 110-122 may include, for example, hardware devices including electronic circuitry for implementing the functionality described herein. In addition or as an alternative, each module 110-122 may be implemented as a series of instructions encoded on a machine-readable storage medium of computing device 100 and executable by processor 130. It should be noted that, in some embodiments, some modules are implemented as hardware devices, while other modules are implemented as executable instructions.

AG. 3 is a flowchart of a method for generating a regular expression based on a set of passing strings and a set of blocked strings, according to one example. Although execution of method 300 is described below with reference to computing device 100, other suitable components for execution of method 300 can be utilized (e.g., computing device 500). Additionally, the components for executing the method 300 may be spread among multiple devices. Method 300 may be implemented in the form of executable instructions stored on a machine-readable storage medium, such as storage medium 520, and/or in the form of electronic circuitry. As such, method 300 can be computer implemented. As such, one or more portions of the method 300 can be implemented at at least one processor of the computing device 100, a computing system, a set of computing devices, etc.

At 302, the computing device determines a passing set of stings and a blocked set of other strings. As noted above, the sets can be determined from various means, such as being acquired from one or more databases, being selected, being entered, or the like.

At 304, the computing device can determine a first regular expression based on the passing set. As noted above, the strings in the passing set can be used to generate a graph. Data structures (e.g., characters or words) can be determined from the strings. In one example, starting with a first one of the passing set of strings, the strings can be iteratively added into a graph using an algorithm that, based on a priority, maximizes the number of reused cells in the graph and maximizes the number of consecutive matching cells. In an example, the first priority can be given to maximizing the number of reused cells. Additional priorities may also be added. This can continue until each of the data structures for each string is added to the graph.

The regular expression can be determined based on the graph. If a respective cell of the graph is reused a same number of times as a number of the strings in the passing set, the respective cell is added to the first regular expression as a string literal. In some examples, a string literal is a representation of a string value (e.g., a word or character). In this scenario, the string literal is not a wild card. Further, in some examples, if the respective cell is a string literal and has multiple children cells in the graph, a wild card is added to the regular expression after the respective cell. The graph can be traversed in this manner as further detailed above to generate a first regular expression.

At 306, the determined first regular expression is compared with the blocked set of other strings to determine whether at least one of the other strings would be passed through the first regular expression. In one example, if no blocked string is passed, the first regular expression is used as a filter regular expression and the method 300 stops. In another example, if at least one of the other strings passes through the first regular expression, the method 300 continues to 308, where, based on the comparison determination, the passing set of strings is divided into a first subset and a second subset of strings based on similarity. Similarity can be determined based on string distance as discussed above. Regular expressions are determined for each of the subsets (310). The regular expressions can be determined in the same approach as with the first regular expression. As such, a second regular expression can be determined for the first subset and a third regular expression can be determined for the second subset.

At 312, the respective regular expressions are compared against the blocked set. If the respective regular expression does not allow any of the blocked set to pass, the respective regular expression can be stored (e.g., in a volatile or non-volatile memory) for ORing at 314.

In one example, when the second regular expression is compared with the blocked set of other strings, at least one of the other strings would be passed through the second regular expression. Based on the comparison determination, the first subset can be further processed at 308. As such, based on the first subset can be divided into a third subset and a fourth subset based on similarity. Then, at 310, a fifth regular expression can be determined based on the third subset and a sixth regular expression can be determined based on the fourth subset. 312 can be performed on each of the subsets, including the second subset, third subset, fourth subset, and any further subset that is generated based on the decision made at 312.

At 314, the regular expressions can be ORed together to generate a filter regular expression. In one example, both the second regular expression and the third regular expression are ORed to determine a fourth regular expression that can be used as the filter regular expression. In another example, the fifth and sixth regular expression are used to update the second regular expression. In this example, the third regular expression ends up being ORed with the fifth and sixth regular expressions to generate the filter regular expression.

As noted above, the filter regular expressions can be used in alarms. As such, a plurality of alarms can be monitored. The filter regular expression can be used to filter the alarms. If the alarms match the filter and/or if a condition exists based on the alarms that pass through the filter regular expression, a set of rules is implemented.

Figure 4:
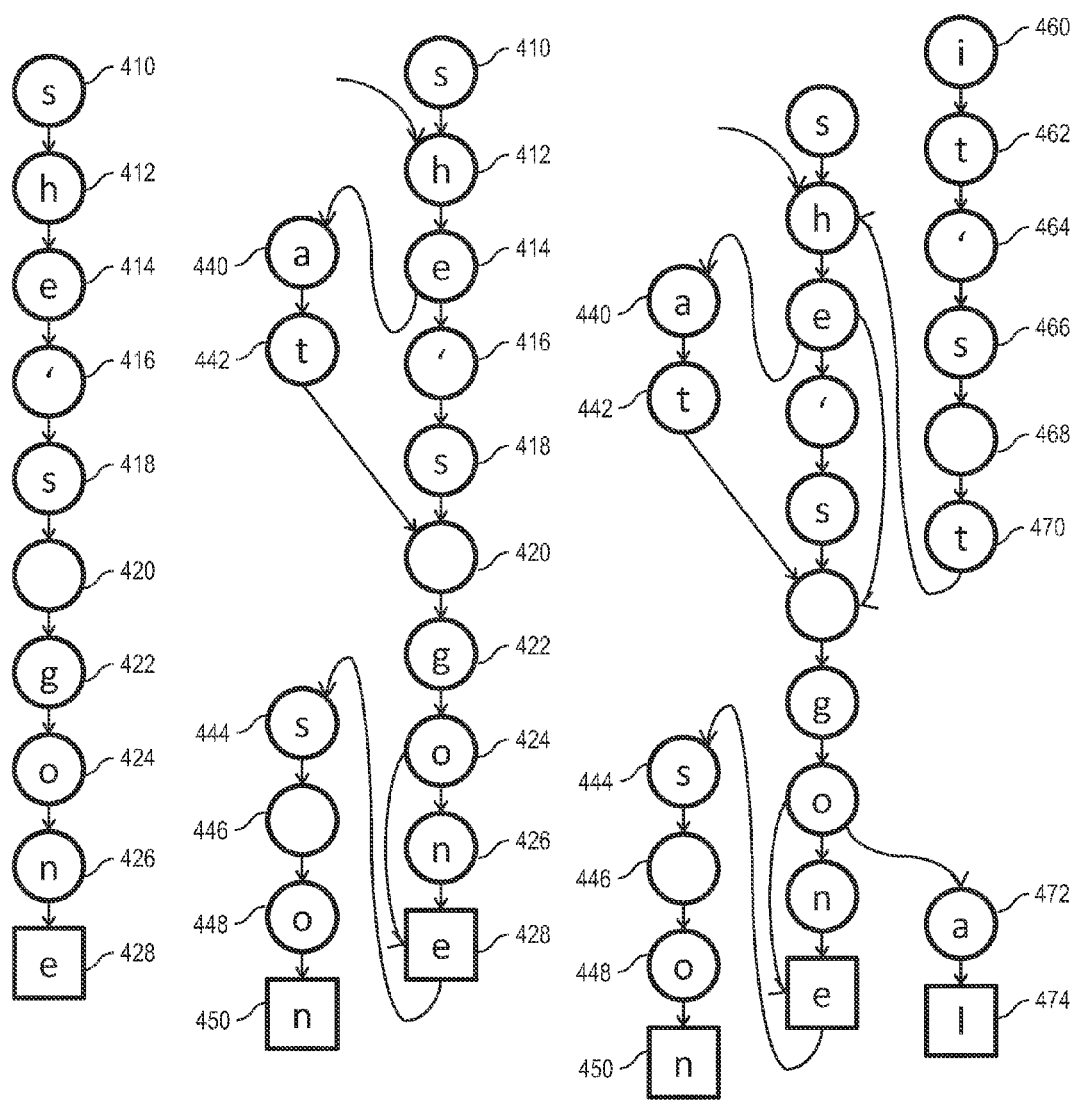
FIG. 4 is a diagram of adding passing strings to a graph, according to one example.

FIG. 4 is a diagram of adding passing strings to a graph, according to one example. In this scenario the strings "she's gone" 400, "heat goes on" 402, and "it's the goal" 404 are in the passing string set. As such, a graph is made of the strings. The first string 400 is added to the graph first. Using the data structure of character cells, the characters 's' 410, 'h' 412, 'e' 414, "'", 416 's' 418, ' ' 420, 'g' 422, 'o' 424, 'n' 426, and 'e' 428 can be used. At this point each of the cells 410-428 are reused by each of the strings (string 400) in the graph.

Then, the second string is added. As noted, the strings can be added based on (a) maximizing the number of re-used cells in the graph and/or (b) maximizing the number of consecutive matching cells. In this scenario, the characters 'h' 412, 'e' 414, ' ' 420, 'g' 422, 'o' 424, and 'e' 428 are reused. The other characters, for example, 'a' 440, 't', 442, 's' 444, 446, 'o' 448, and 'n' 450 can be added to the graph. As with 'a' 440 and 't' 442, some of these cells can be added between reused cells.

The third string can be added. In this scenario, 'h' 412, 'e' 414, ' ' 420, 'g' 422, and 'o' 424 are reused. 'i' 460, 't' 462, '"464, 's' 466, ' ' 468, 't' 470, 'a' 472, and 'l' 474 are added to the graph. In some examples, the order can vary and/or can be arbitrary. As such, in certain scenarios, the third string can be the first string added to the graph.

Processing the graph to generate a regular expression, it can be determined that because 's' 410 and 'i' 460 are two separate entry points to the strings, that the regular expression should start with and '.*'. Next, one of the children of the entry points is chosen. Nothing is added to the regular expression unless a cell is present that is reused by each of the strings. Here, each of the cells is traversed until 'h' 412 is reached. Here, 'h' 412 is added to the regular expression as a string literal. 'e' 414 follows and is also present in each of the strings. As such, 'e' 414 is added as a string literal. 'e' 414 has multiple children, thus, another '.*' is added to the regular expression. A single child is chosen and the graph continues to be traversed. The next cell that is included in each of the strings is ' ' 420. As such, ' ' is added as a string literal. 'g' 422 and 'o' 424 is similarly added as string literals because the cells are present in each of the strings. 'o' has multiple children, so another wild card is added to the regular expression. There are no further cells that include a character that is present in each of the strings; therefore, the regular expression is complete. In this example, the regular expression determined is ".*he.* go.*". This is a simplified example of determining a graph and then a regular expression from the complete graph. More strings can be added. Further, it is contemplated that sets of strings may not have anything in common through the whole set, which can yield a regular expression of a ".*". This can be changed by caught when comparing to the blocked strings and dividing the set into subsets.

Figure 5:
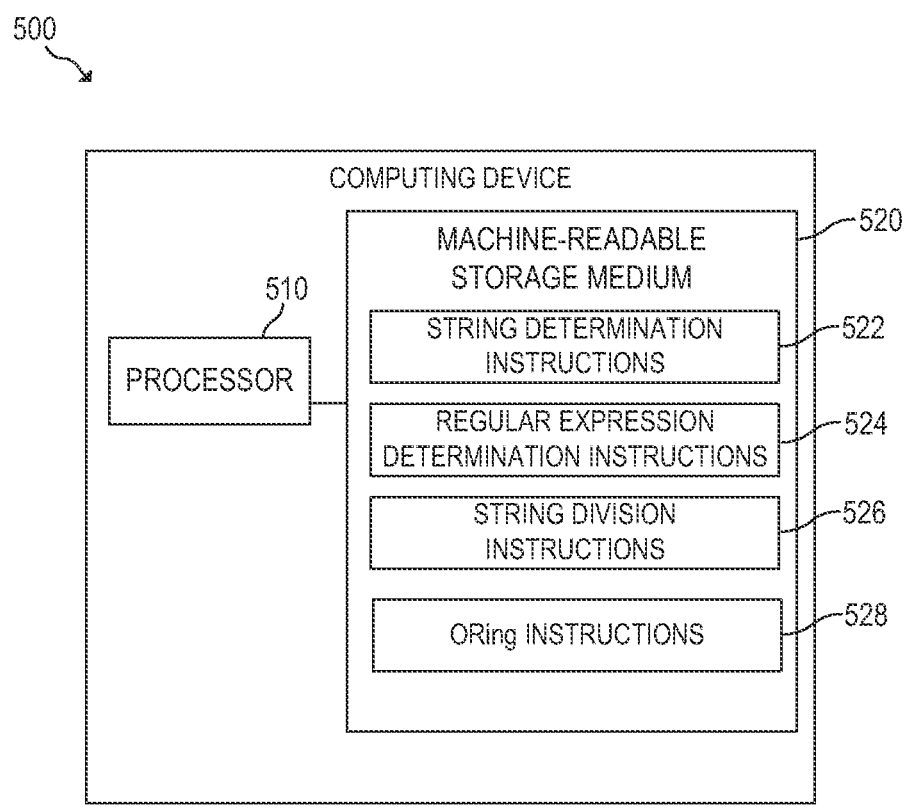
FIG. 5 is a block diagram of a computing device capable of determining a regular expression based on a passing set of strings and a blocked set of strings, according to one example.

FIG. 5 is a block diagram of a computing device capable of determining a regular expression based on a passing set of strings and a blocked set of strings, according to one example. The computing device 500 includes, for example, a processor 510, and a machine-readable storage medium 520 including instructions 522, 524, 526, 528 for determining a regular expression based on a passing set of strings and a blocked set of strings. Computing device 100 may be, for example, a notebook computer, a slate computing device, a portable reading device, a wireless email device, a mobile phone, a server, a network device, a workstation, or any other computing device.

Processor 510 may be, at least one central processing unit (CPU), at least one semiconductor-based microprocessor, at least one graphics processing unit (GPU), other hardware devices suitable for retrieval and execution of instructions stored in machine-readable storage medium 520, or combinations thereof. For example, the processor 510 may include multiple cores on a chip, include multiple cores across multiple chips, multiple cores across multiple devices (e.g., if the computing device 500 includes multiple node devices), be another type of processing resource, or combinations thereof. Processor 510 may fetch, decode, and execute instructions 522, 524, 526, 528 to determine a regular expression based on a passing set of strings and a blocked set of strings (e.g., implement method 300). As an alternative or in addition to retrieving and executing instructions, processor 510 may include at least one integrated circuit (IC), other control logic, other electronic circuits, or combinations thereof that include a number of electronic components for performing the functionality of instructions 522, 524, 526, 528.

Machine-readable storage medium 520 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 520 may be encoded with a series of executable instructions for generating a regular expression based on a passing set and a blocked set of strings.

The string determination instructions 522 can be executed by the processor 510 to determine a passing set of strings and a blocked set of strings. As noted, various approaches can be used to determine the sets. Regular expression determination instructions 524 can be executed to determine a regular expression based on the passing set as discussed above. As noted, data structures such as characters or words can be used as cells to generate a graph of the passing set of strings.

Then, string division instructions 526 can be executed to divide the passing set into two subsets of strings based on similarity if one of the blocked strings would pass through the regular expression. In some examples, the similarity can be based on string distance as described earlier.

For each of the subsets, a respective subset regular expression is determined based on the respective subset. The determined regular expressions are compared to the blocked set. For any of the subsets for which one of the blocked strings would be passed through the respective subset regular expression, the subset is divided further and the process is repeated. The subsets that do not allow blocked strings to pass are ORed together to generate a filter regular expression by executing ORing instructions 528.

As noted, the filter regular expression can be used in conjunction with alarms. The computing device or another computing device can monitor alarms. If the alarms match the filter regular expression, a set of rules can be implemented. The filter regular expression can be used for other uses as well, for example, to filter names or other data. Further, multiple filters can be used can be determined using the processes described herein. In some examples, the filters can be determined on one or more machine or device and used on one or more other machines or devices. In some examples, the same device can be used to determine the filters and use the filters.

What is claimed is:

1. A method comprising:
   determining, by a system comprising a processor, a first regular expression based on a passing set of first strings corresponding to alarms that are to pass through a filter;
   comparing, by the system, the first regular expression with a blocked set of second strings to determine that at least a second string of the second strings would be passed through the first regular expression, the blocked set of second strings corresponding to alarms that are to be blocked from passing through the filter;
   based on the determining that the at least one second string would be passed through the first regular expression, dividing, by the system, the passing set into a first subset of the first strings and a second subset of the first strings based on similarity;
   determining, by the system, a second regular expression based on the first subset, and a third regular expression based on the second subset;
   in response to determining that none of the blocked set of second strings would pass through each of the second regular expression and the third regular expression, combining, by the system, the second regular expression and the third regular expression to determine a filter regular expression that represents the filter, filtering, by the system using the filter regular expression, an alarm received from a device; and in response to the received alarm passing through the filter regular expression, performing, by the system, an action to address an issue corresponding to the received alarm.

2. The method of claim 1, wherein determining the first regular expression comprises:

determining data structures from the first strings; and starting with the data structure of a first of the first strings, iteratively adding the data structures into a graph using an algorithm that, based on a priority, maximizes a number of re-used cells in the graph, and maximizes a number of consecutive matching cells.

3. The method of claim 2, further comprising:

in response to determining that a given cell is re-used a same number of times as a number of the first strings in the passing set, adding the given cell to the first regular expression as a string literal.

4. The method of claim 3, further comprising:

in response to determining that the given cell is the string literal and has multiple children, adding a wild card to the first regular expression after the given cell.

5. The method of claim 1, further comprising:

comparing the second regular expression with the blocked set of second strings to determine that a given second string of the second strings would be passed through the second regular expression;

in response to determining that the given second string would pass through the second regular expression,
dividing the first subset into a third subset and a fourth subset based on similarity;
determining a fifth regular expression based on the third subset, and a sixth regular expression based on the fourth subset; and
combining the fifth regular expression and the sixth regular expression to update the second regular expression.

6. The method of claim 2, wherein each data structure of the data structures is a character or a word.

7. The method of claim 1, further comprising:

in response to determining that a second string of the blocked set of second strings would pass through the second regular expression,
dividing the first subset into a third subset of the first strings and a fourth subset of the first strings,
determining a fourth regular expression based on the third subset, and a fifth regular expression based on the fourth subset,
combining the fourth regular expression, the fifth regular expression, and the third regular expression to generate a further filter regular expression that represents the filter,
filter, using the further filter regular expression, the received alarm; and
in response to the received alarm passing through the further filter regular expression, perform an action to address an issue corresponding to the received alarm.

8. The method of claim 1, wherein combining the second regular expression and the third regular expression comprises ORing the second regular expression and the third regular expression.

9. A non-transitory machine-readable storage medium storing instructions that, if executed by at least one processor of a device, cause the device to:

determine a regular expression based on a passing set of first strings corresponding to alarms that are to pass through a filter;

divide the passing set into subsets of the first strings based on similarity in response to determining that a second string of a blocked set of second strings would be passed through the regular expression, the blocked set of second strings corresponding to alarms that are to be blocked from passing through the filter;

perform a process comprising:
determining respective subset regular expressions based on the subsets,
for any given subset of the subsets for which a second string of the blocked set of second strings would be passed through the respective subset regular expression, dividing the given subset into further subsets, and re-iterating the performing of the process for the further subsets;

ORing the subset regular expressions of the subsets that do not pass through any of the second strings to generate a filter regular expression representing the filter;

filter, using the filter regular expression, an alarm received from a device; and in response to the received alarm passing through the filter regular expression, perform an action to address an issue corresponding to the received alarm in response to the received alarm matching a rule.

10. The non-transitory machine-readable storage medium of claim 9, wherein determining the regular expression comprises:

determine data structures from the passing set of first strings; and starting with the data structure for a first of the first strings, iteratively add the data structures into a graph using an algorithm that, based on a priority, maximizes a number of re-used cells in the graph, and maximizes a number of consecutive matching cells, wherein each data structure of the data structures is one of: a character and a word, and wherein the similarity is based on string distance.

11. The non-transitory machine-readable storage medium of claim 10, wherein the instructions if executed cause the device to:

in response to determining that a given cell is re-used a same number of times as a number of the first strings in the passing set, add the given cell to the regular expression as a string literal; and in response to determining that the given cell is the string literal and has multiple children, add a wild card to the regular expression after the given cell.

12. A computing device comprising:

at least one processor; and a non-transitory machine-readable storage medium storing instructions executable on the at least one processor to:
determine a first regular expression based on a passing set of first strings corresponding to alarms that are to pass through a filter;
divide the passing set into first and second subsets of the first strings based on similarity in response to determining that a second string of a blocked set of second strings would be passed through the regular expression, the blocked set of second strings corresponding to alarms that are to be blocked from passing through the filter, determine a second regular expression based on the first subset, and a third regular expression based on the second subset;

in response to determining that none of the blocked set of second strings would pass through each of the second regular expression and the third regular expression, OR the second and third regular expressions to generate a filter regular expression representing the filter, and filter, using the filter regular expression, an alarm received from a device; and in response to the received alarm passing through the filter regular expression, perform an action to address an issue corresponding to the received alarm.

13. The computing device of claim 12, wherein the determining of the first regular expression comprises:

determining data structures from the passing set of first strings; and starting with the data structure for a first of the first strings, iteratively add the data structures into a graph using an algorithm that, based on a priority, maximizes a number of re-used cells in the graph, and maximizes a number of consecutive matching cells.

\* \* \* \* \*